UNITED STATES PATENT OFFICE 2,254,745

RECOVERY OF PHENOLS

Joseph Jannek, Ludwigshafen-on-the-Rhine, Germany, assignor, by mesne assignments, to William Ellyson Currie, New York, N. Y.

No Drawing. Application September 13, 1939, Serial No. 294,676. In Germany September 24, 1938

1 Claim. (Cl. 260—627)

The present invention relates to the recovery of phenols from their aqueous solutions.

It has already been proposed to recover phenols from their aqueous solutions, as for example waste waters from coke-oven plants or low temperature-carbonization or hydrogenation plants, by adsorption with active carbon. The carrying out of this process in practice is, however, unsatisfactory because the efficiency of the active carbons usual for this purpose soon subsides during the flowing of the water containing phenol through the layer of carbon, and the total loading capacity of the carbons for phenol is insufficient. Even otherwise very active adsorption carbons, which are eminently suitable for example for adsorbing gases and vapors, have only a moderate action in the adsorption of phenols from aqueous solution. Highly active silica gels are quite inactive for this purpose.

I have now found that lean coal, i. e. non-coking lean mineral coal, which has been activated with steam or gases containing steam, such as flame gases, for example according to the process of the U. S. specification 1,582,718, has an excellent adsorption capacity for phenols in aqueous solution as compared with other active carbons. This may be seen from the following comparative tests.

200 cubic centimeters of various active carbons are used in granular form in a vertical tube so that the height of the layers is 65 centimeters. The phenol solution, which contains 3 grams of phenol per liter, is led through the layer of carbon upwards with a speed of flow of 1 liter per hour. On the one hand the amount of phenol solution is determined which can be led through the carbon layer until the relative saturation point or in other words until the penetration point is reached (i. e. until there occurs in the effluent water the first detectable trace, namely about 0.01 gram of phenol per liter), and on the other hand the amount of phenol solution which can be worked up until absolute saturation of the carbon with phenol occurs (i. e. until the phenol content of the effluent water is the same as the phenol content of the entering solution).

In addition to these values, the benzene adsorption value (benzene value) is determined, i. e. the amount of benzene per gram which is taken up by 100 cubic centimeters of the carbon at 20° C. from a gas current saturated with benzene vapor.

| Adsorption agent | Benzene value | Liters of phenol water | |
|---|---|---|---|
| | | Relative saturation | Absolute saturation |
| Peat activated with zinc chloride | 19 | 0.5 | 1.5 |
| Peat and wood activated with phosphoric acid | 18 | 0.5 | 1 |
| Humus coal activated with potassium carbonate | 17 | 2 | 3 |
| Wood carbon activated with steam | 9 | 1 | 1.5 |
| Brown coal coke activated with steam | 10 | 1 | 2 |
| Non-coking mineral coal activated with steam | 18 | 8 | 9 |
| Silicic acid gel | 17 | 0 | 0 |

The non-coking mineral coal activated with steam is thus far superior to the other carbons. Its high speed of adsorption is also noteworthy, which may be seen from the favorable ratio of relative saturation to absolute saturation. This property renders possible the use of rather short adsorption zones or of correspondingly greater speeds of throughput.

The active carbon laden with phenol after drying, may be regenerated in known manner by extraction with an organic solvent, as for example benzene or benzine, or advantageously with liquid ammonia under pressure.

In the purification of waste waters it is preferable to arrange, in front of the layer of active carbon intended for the adsorption of phenol, a smaller layer of a porous substance which need have no considerable activity, as for example coke or the like, which only has to be renewed at very infrequent intervals, in order to remove any traces of tar or other contaminating substances present in the phenol water.

In the case of waste waters containing hydrogen sulphide, it is advantageous to expel the air from the carbon layer by means of water before commencing the throughput, in order to avoid any deposition of sulphur in the carbon.

What I claim is:

In the process of recovering phenols from their aqueous solutions by adsorption with active carbon the improvement which comprises using as the adsorbent non-coking mineral coal which has been activated with steam.

JOSEPH JANNEK.